(12) United States Patent
Schuricht et al.

(10) Patent No.: US 7,006,910 B2
(45) Date of Patent: Feb. 28, 2006

(54) ENGINE POWER LOSS COMPENSATION

(75) Inventors: Scott R. Schuricht, Normal, IL (US);
David A. Pierpont, Dunlap, IL (US);
Travis E. Barnes, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/453,269

(22) Filed: Jun. 3, 2003

(65) Prior Publication Data
US 2004/0249554 A1 Dec. 9, 2004

(51) Int. Cl.
*B60T 7/70* (2006.01)
(52) U.S. Cl. .................. 701/105; 701/101; 701/103; 701/110; 701/114; 123/478; 123/480
(58) Field of Classification Search ............. 701/101, 701/103, 105, 110, 114; 123/480, 478
See application file for complete search history.

(56) References Cited

U.S. PATENT DOCUMENTS

| | | | |
|---|---|---|---|
| 3,689,200 A | 9/1972 | Galis et al. | |
| 4,187,813 A | 2/1980 | Stumpp | |
| 4,222,713 A | 9/1980 | DeKeyser et al. | |
| 4,278,407 A | 7/1981 | Yasuhara et al. | |
| 4,991,102 A * | 2/1991 | Sakamoto et al. | 701/109 |
| 5,174,266 A | 12/1992 | Evdokimo | |
| 5,444,627 A | 8/1995 | Sandborg et al. | |
| 5,474,052 A | 12/1995 | Aquino et al. | |
| 5,522,365 A * | 6/1996 | Milunas et al. | 123/480 |
| 5,540,094 A * | 7/1996 | Varnham et al. | 73/504.13 |
| 5,558,069 A | 9/1996 | Stay | |
| 5,778,861 A | 7/1998 | Diduck | |
| 5,816,220 A | 10/1998 | Stumpp et al. | |
| 5,865,158 A | 2/1999 | Cleveland et al. | |
| 6,041,279 A | 3/2000 | Maki et al. | |
| 6,109,244 A * | 8/2000 | Yamamoto et al. | 123/478 |
| 6,138,642 A * | 10/2000 | Zhang et al. | 123/478 |
| 6,289,275 B1 | 9/2001 | Stander et al. | |
| 6,367,462 B1 * | 4/2002 | McKay et al. | 123/568.21 |
| 6,446,618 B1 * | 9/2002 | Hill | 123/698 |
| 6,480,781 B1 | 11/2002 | Hafner et al. | |
| 6,520,167 B1 * | 2/2003 | Kanno | 123/674 |
| 6,662,795 B1 * | 12/2003 | Baldwin et al. | 123/676 |
| 2002/0143458 A1 | 10/2002 | Walker et al. | |

* cited by examiner

*Primary Examiner*—Tony M. Argenbright
*Assistant Examiner*—Johnny H. Hoang

(57) ABSTRACT

A method and apparatus for determining a parameter associated with a delivery of fuel in an engine. The method and apparatus includes determining an initial parameter value associated with the delivery of fuel, determining at least one compensation factor based on a heating effect of a fuel and a fuel system, and applying the at least one compensation factor to the initial parameter value to derive a compensated parameter value.

24 Claims, 9 Drawing Sheets

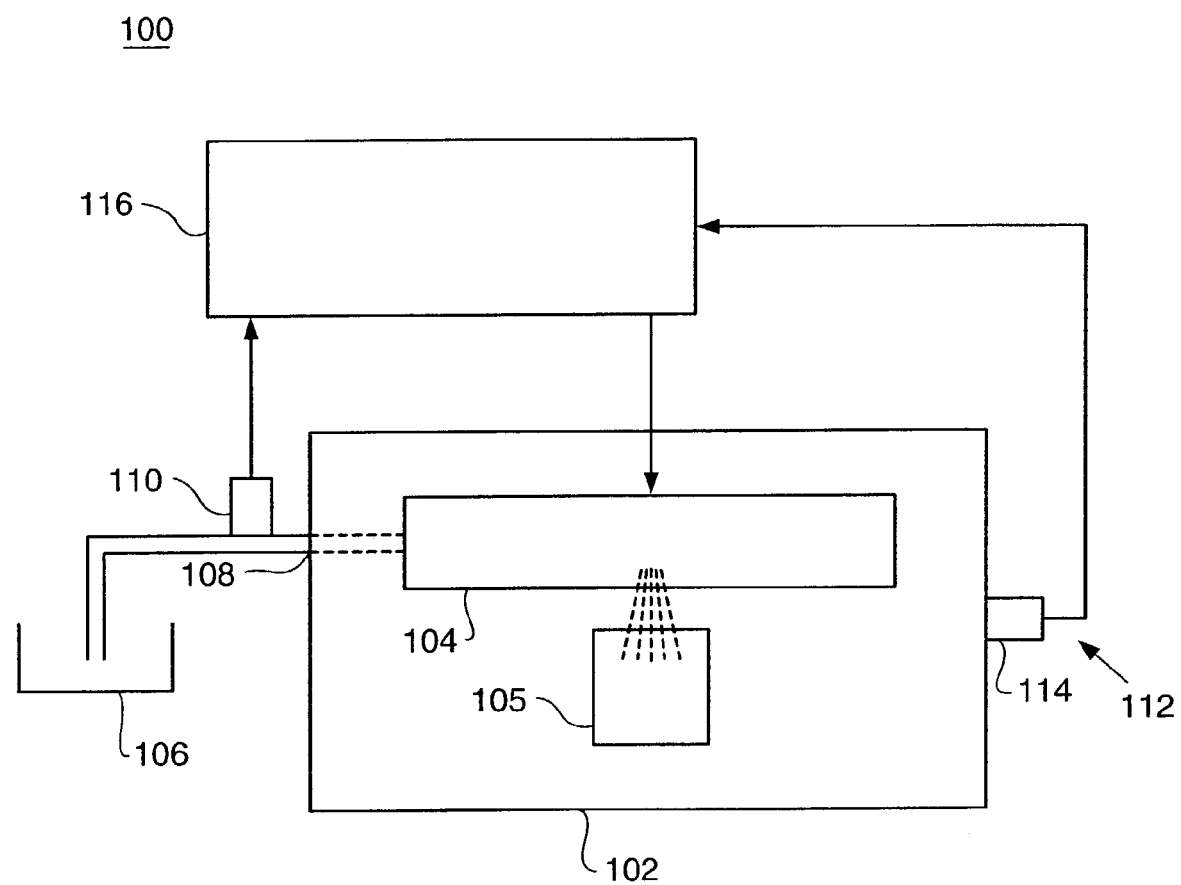

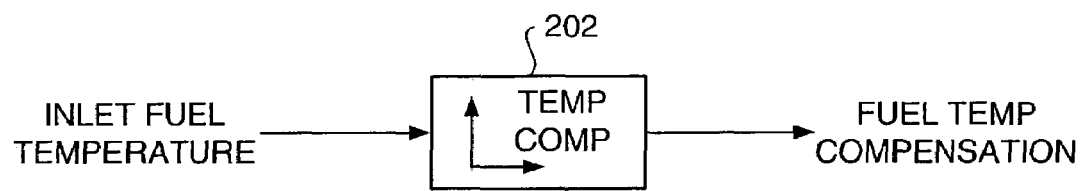
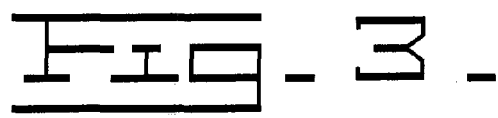
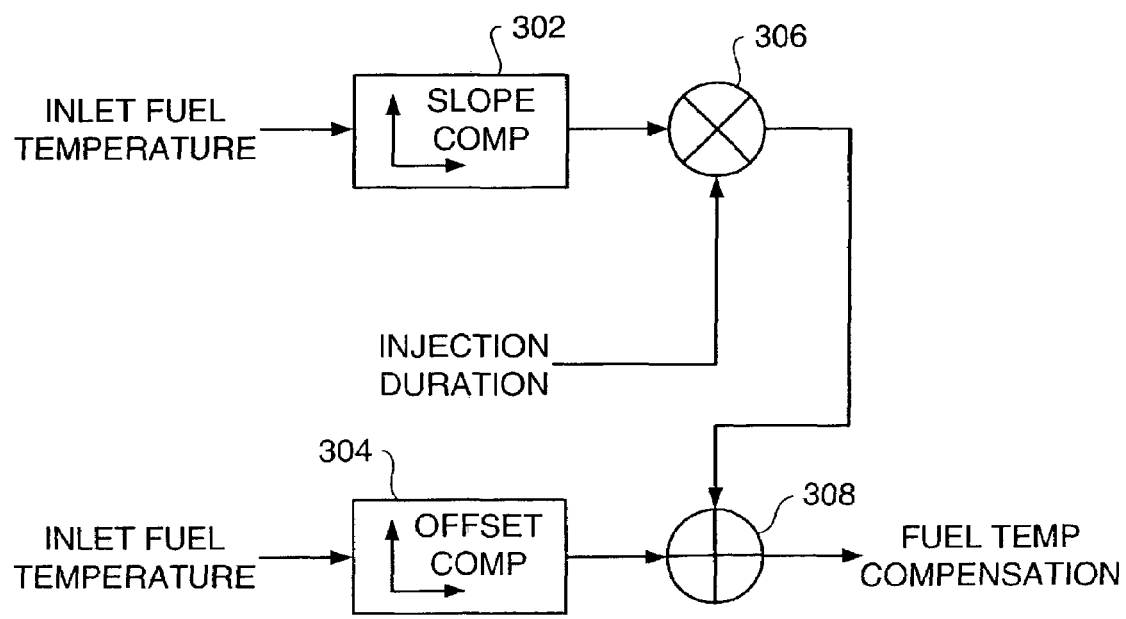

Fig_4_

| INLET FUEL TEMPERATURE (C) | 0 | 20 | 40 | 60 | 80 | 100 |
|---|---|---|---|---|---|---|
| TEMPERATURE COMPENSATION (us) | -100 | -50 | 0 | 50 | 100 | 120 |

202   FUEL TEMPERATURE COMPENSATION MAP

Fig_5_

| INLET FUEL TEMPERATURE (C) | 0 | 20 | 40 | 60 | 80 | 100 |
|---|---|---|---|---|---|---|
| OFFSET COMPENSATION (us) | -50 | -20 | 0 | 20 | 50 | 60 |

304   FUEL TEMPERATURE OFFSET COMPENSATION MAP

Fig_6_

| INLET FUEL TEMPERATURE (C) | 0 | 20 | 40 | 60 | 80 | 100 |
|---|---|---|---|---|---|---|
| SLOPE COMPENSATION (us / us) | -0.0010 | -0.0010 | 0.0000 | 0.0008 | 0.0030 | 0.0018 |

302   FUEL TEMPERATURE SLOPE COMPENSATION MAP

| ENGINE SPEED (RPM) | 600 | 800 | 1000 | 1200 | 1400 | 1600 | 1800 | 2100 |
|---|---|---|---|---|---|---|---|---|
| OFFSET VALUE (us) | 1100 | 1100 | 1100 | 1000 | 950 | 900 | 850 | 800 |
702     POWER TRIM OFFSET MAP
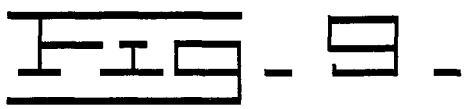
| ENGINE SPEED | FUEL DELIVERY QUANTITY | | | | | | | |
|---|---|---|---|---|---|---|---|---|
|  | 2.00 | 4.90 | 6.95 | 7.91 | 8.50 | 8.90 | 9.55 | 10.30 |
| 600 | 0.00000 | 0.00000 | 0.00000 | 0.00000 | 0.00000 | 0.00000 | 0.00000 | 0.00000 |
| 1200 | 0.00000 | 0.00945 | 0.01129 | 0.01170 | 0.02522 | 0.03282 | 0.04295 | 0.05216 |
| 1500 | 0.00000 | 0.01294 | 0.02145 | 0.02349 | 0.03378 | 0.03972 | 0.04805 | 0.05607 |
| 1800 | 0.00000 | 0.03528 | 0.03694 | 0.04962 | 0.05486 | 0.05763 | 0.06128 | 0.06455 |
| 2100 | 0.00000 | 0.05018 | 0.06462 | 0.07131 | 0.07364 | 0.07238 | 0.07083 | 0.06954 |
704     STEADY STATE CORRECTION FACTOR MAP

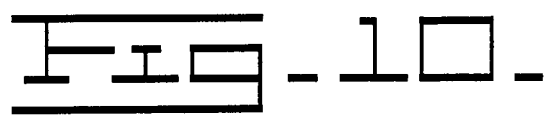
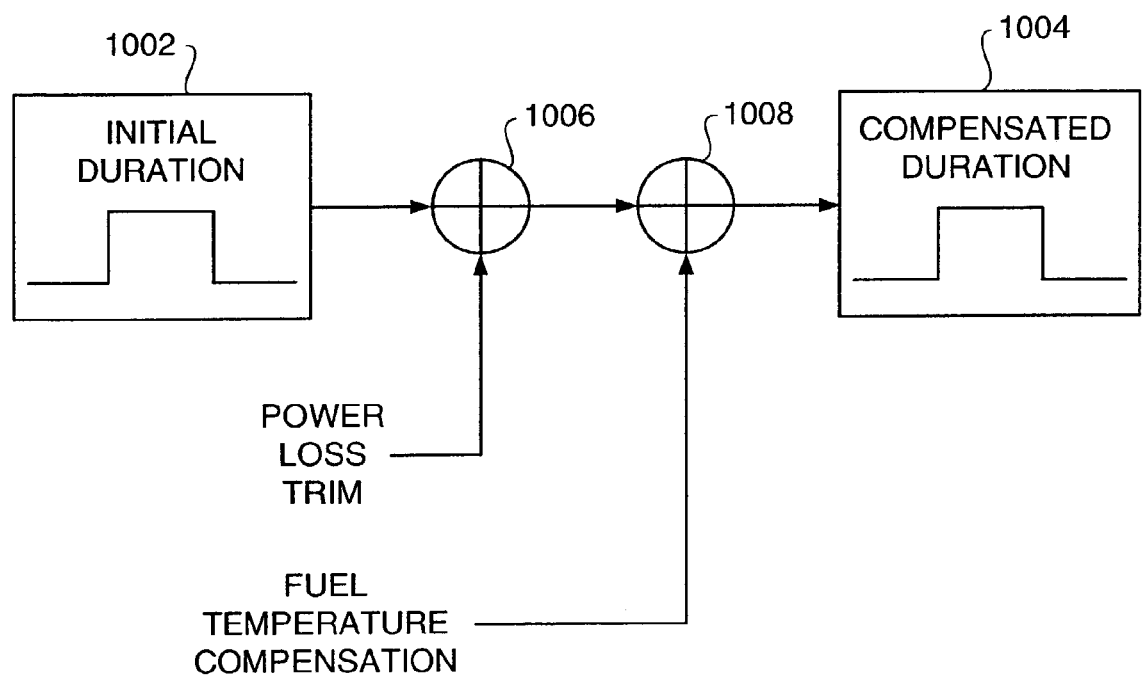

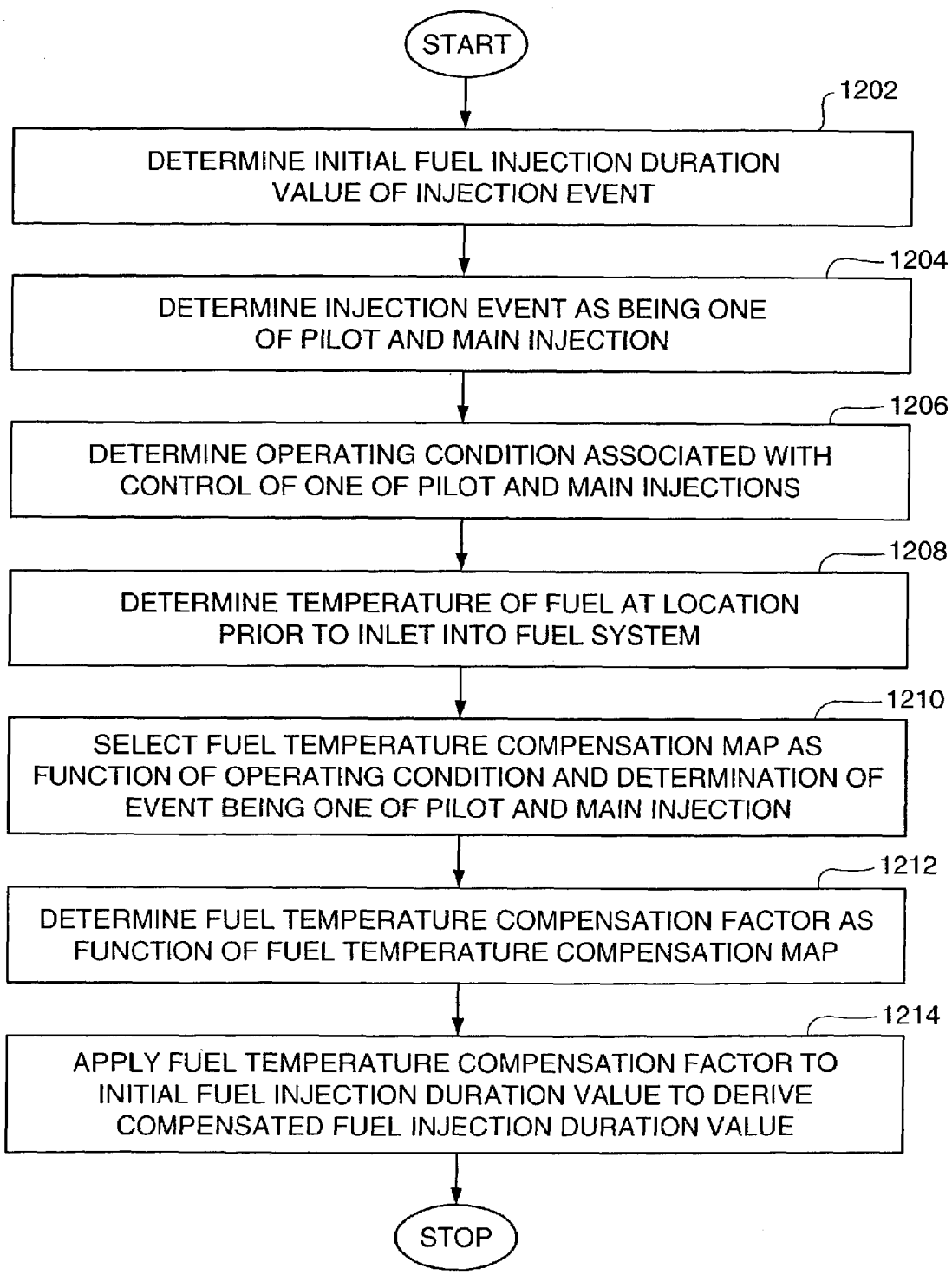

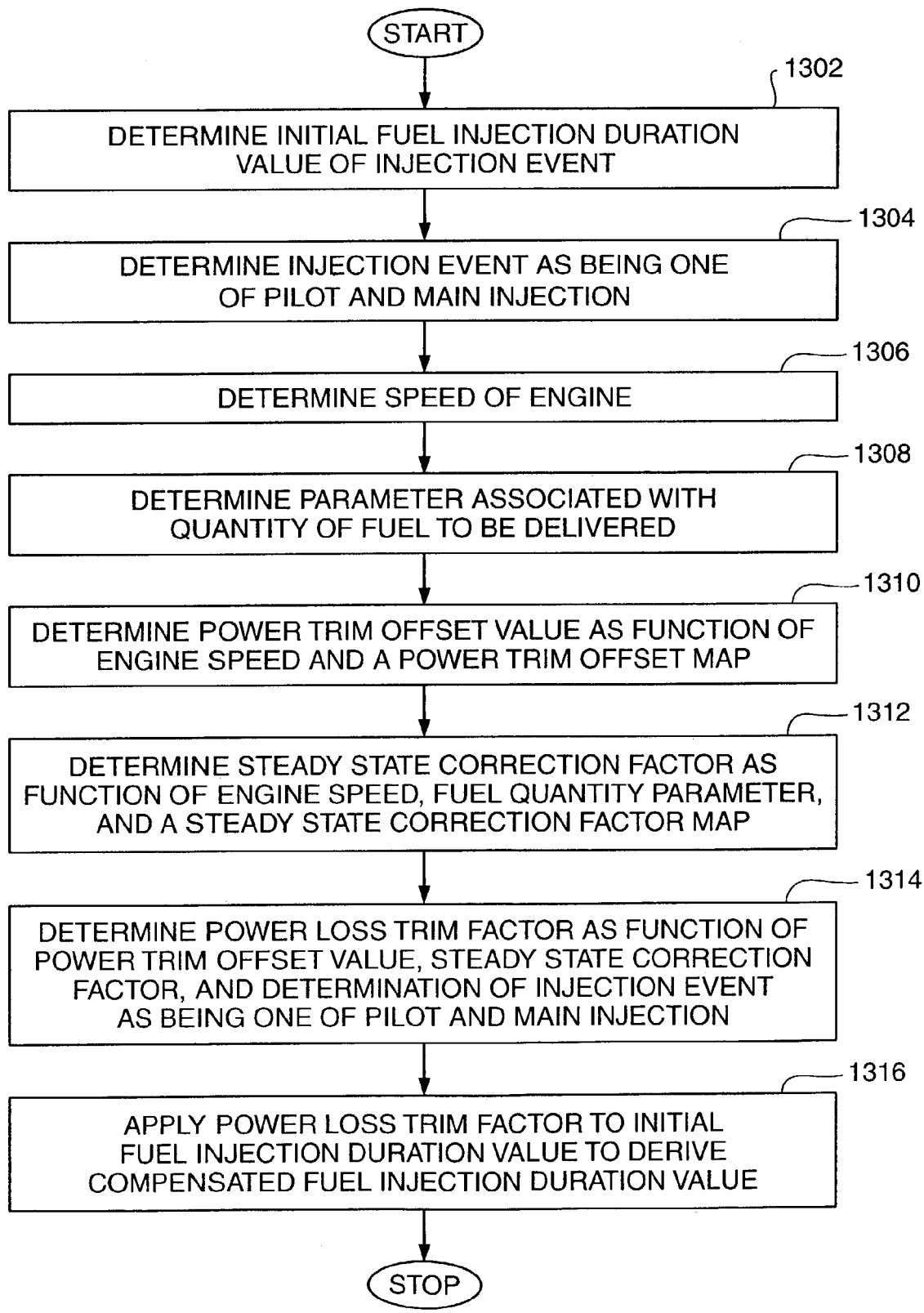

ENGINE POWER LOSS COMPENSATION

TECHNICAL FIELD

This invention relates generally to a method and apparatus for compensating for a power loss condition of an engine and, more particularly, to a method and apparatus for compensating for a power loss caused by changes in fuel temperature.

BACKGROUND

It has long been known that operating characteristics of an internal combustion engine change in response to changes in parameters. For example, changes in temperature of a fuel over a period of time may affect characteristics of an engine such as power delivered. More specifically, it is known that, as fuel temperature changes, engine power may decrease if the change in fuel temperature is not compensated for.

Attempts have been made to provide compensation for changes in fuel temperature. As an example, in U.S. Pat. No. 5,444,627, Sandborg et al. provides a fuel delivery temperature compensation system and method which calculates a compensated fuel delivery map based on sensed fuel temperature and engine speed.

Although the disclosed invention of Sandborg et al. does much to alleviate the power loss condition associated with changing fuel temperature, the problem of power loss is caused by much more than just the temperature of the fuel. The change in fuel temperature is a combination of the ambient temperature of the fuel and other factors such as heating of the fuel, injectors, rails and other fuel system components during periods of engine use at high speeds and loads.

The present invention is directed to overcoming one or more of the problems as set forth above.

SUMMARY OF THE INVENTION

In one aspect of the present invention a method for determining a parameter associated with a delivery of fuel in an engine is disclosed. The method includes the steps of determining an initial parameter value associated with the delivery of fuel, determining at least one compensation factor based on a heating effect of a fuel and a fuel system, and applying the at least one compensation factor to the initial parameter value to derive a compensated parameter value.

In another aspect of the present invention a method for determining a fuel injection event parameter for an internal combustion engine is disclosed. The method includes the steps of determining an initial fuel injection event parameter, determining at least one of a fuel temperature compensation factor and a power loss trim factor, and determining a compensated fuel injection event parameter as a function of the initial fuel injection event parameter and the at least one fuel temperature compensation factor and power loss trim factor.

In yet another aspect of the present invention a method for compensating for fuel temperature during an injection of fuel into a fuel system in an engine is disclosed. The method includes the steps of determining an initial fuel injection duration value of an injection event, determining the injection event as being one of a pilot and a main injection, determining an operating condition associated with control of one of the pilot and main injections, determining a temperature of fuel at a location prior to inlet into the fuel system, selecting a fuel temperature compensation map as a function of the operating condition and the determination of the event being one of a pilot and a main injection, determining a fuel temperature compensation factor as a function of the fuel temperature compensation map, and applying the fuel temperature compensation factor to the initial fuel injection duration value to derive a compensated fuel injection duration value.

In yet another aspect of the present invention a method for compensating for a power loss condition during an injection of fuel into a fuel system in an engine is disclosed. The method includes the steps of determining an initial fuel injection duration value of an injection event, determining the injection event as being one of a pilot and a main injection, determining a speed of the engine, determining a parameter associated with a quantity of fuel to be delivered, determining a power trim offset value as a function of the engine speed and a power trim offset map, determining a steady state correction factor as a function of the engine speed, the fuel quantity parameter, and a steady state correction factor map, determining a power loss trim factor as a function of the power trim offset value, the steady state correction factor, and the determination of the injection event as being one of a pilot and a main injection, and applying the power loss trim factor to the initial fuel injection duration value to derive a compensated fuel injection duration value.

In still another aspect of the present invention an apparatus for determining a duration value for a fuel injection event of a fuel system in an internal combustion engine is disclosed. The apparatus includes a fuel supply, a fuel system inlet for receiving fuel from the fuel supply, a temperature sensor located such that a temperature of the fuel prior to the inlet is sensed, an engine speed determining device, and a controller for receiving signals from the temperature sensor and the engine speed determining device, determining at least one of a fuel temperature compensation factor and a power loss trim factor, and responsively determining a compensated duration value for the fuel injection event.

BRIEF DESCRIPTION OF THE DRAWINGS

FIG. 1 is a block diagram illustrating an apparatus suited for use with the present invention;

FIG. 2 is a control diagram of an embodiment of the present invention;

FIG. 3 is a control diagram of another embodiment of the present invention;

FIG. 4 is an exemplary fuel temperature compensation map;

FIG. 5 is an exemplary fuel temperature offset compensation map;

FIG. 6 is an exemplary fuel temperature slope compensation map;

FIG. 8 is an exemplary power trim offset map;

FIG. 9 is an exemplary steady state correction factor map;

FIG. 10 is a control diagram illustrating an overall view of the present invention;

FIG. 12 is a flow diagram illustrating an aspect of the method of FIG. 11; and

FIG. 13 is a flow diagram illustrating another aspect of the method of FIG. 11.

DETAILED DESCRIPTION

Figure 7:
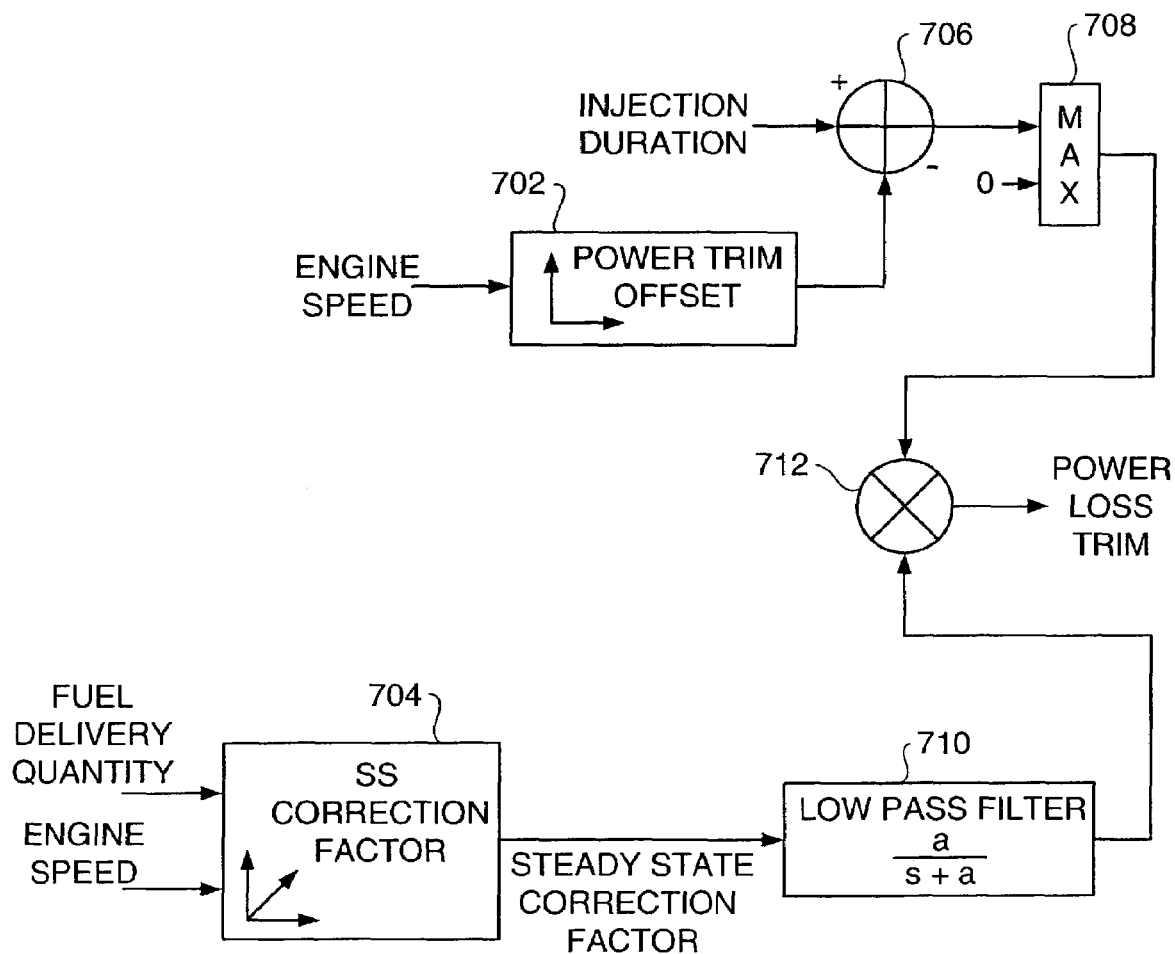
FIG. 7 is a control diagram of another embodiment of the present invention.

Referring to the drawings, a method and apparatus 100 for compensating for power loss of an internal combustion engine 102 caused by temperature of fuel is shown. The method and apparatus 100 has particular value during sustained periods of operation at rated speed during which time the temperature of fuel may increase and components of a fuel system 104 located on the engine 102 may experience internal heating. However, the present invention may also be suited for compensating for heat related power loss during other periods of operation as well, such as normal operating conditions and the like.

Referring particularly to FIG. 1, an engine 102 includes a fuel system 104 to controllably supply fuel for operation. The engine 102 may be any of a number of engine configurations, including any numbers of cylinders (not shown) aligned in a straight, v-type, or some other such arrangement. The engine may be a spark ignited or compression ignited type, although particular application may be found with a diesel fueled compression ignition engine.

The fuel system 104 may include a rail or line for distributing fuel (not shown), a pump (not shown), one or more fuel injectors (not shown), and any other components as may be found in a typical fuel system. Typically, the fuel system 104 is located on the engine 102 such that fuel may be delivered, e.g., injected, into one or more combustion chambers 105 in a controlled manner.

A fuel supply 106 provides a source of fuel for delivery to the fuel system 104. The fuel supply 106 typically includes a fuel tank, one or more fuel filters, and a line for delivering fuel. At some designated point, the fuel supply 106 transitions to the fuel system 104, i.e., at a location in which fuel enters some part of the engine 102, such as a block (not shown). From this point on, internal heating of the fuel system 104 becomes a temperature related issue. This transition point is hereinafter referred to as a fuel system inlet 108.

A temperature sensor 110 is located such that a temperature of the fuel prior to the fuel system inlet 108 is sensed. The temperature sensor 110 may be of any type used for this purpose and may be located somewhere on or near the fuel supply 106. Alternatively, the temperature may be sensed elsewhere, e.g., coolant, ambient air, and the like, and the temperature of the fuel may be determined from the sensed results.

An engine speed determining device 112 is located such that a speed of the engine 102 may be either sensed directly or determined by some indirect means. For example, the engine speed determining device 112 may include one or more engine speed sensors 114. Determining engine speed is well known in the art and requires no further discussion.

A controller 116 is located on or near the engine 102 and receives signals from the temperature sensor 110 and the engine speed determining device 112. The controller 116 is then adapted to determine at least one compensation factor based on the heating effect of the fuel and the fuel system 104 to adjust the delivery of fuel to maintain a desired power output condition of the engine 102. The controller 116 may be a microprocessor based control unit such as an electronic control module, and may perform other engine related functions in addition to temperature compensation of fuel delivery. The operation of the controller 116 is described in much detail below with respect to the present invention.

The present invention may be classified into two main functions: fuel temperature compensation and power loss compensation. These two categories may operate independently and then combined into an overall compensation factor. However, either of the two compensation techniques may be used alone to provide fuel delivery compensation.

FIGS. 2 and 3 illustrate embodiments of control strategies which may be used for fuel temperature compensation.

In FIG. 2, temperature of the fuel prior to the fuel system inlet 108 is input to a fuel temperature compensation map 202. The fuel temperature compensation map 202 may be a two dimensional map designed to provide a fuel temperature compensation factor for a given inlet fuel temperature. FIG. 4 depicts an exemplary fuel temperature compensation map 202, although the values denoted are not meant to represent actual values used in operation.

The fuel temperature compensation map 202, as well as each of the maps discussed below, may be used to provide values for compensation of a fuel delivery parameter such as duration of a fuel injection event. The compensation may be used to modify fuel duration for single shot events or may be used to modify one or more of multiple shots, such as a pilot and a main injection. In addition, the fuel injection event may use varying control parameters for different operating conditions. For example, varying pull-in and hold-in currents may be used to actuate and control the injection event. Typically, a fuel injector receives a first current value sufficient to actuate a valve and then receives a second current value sufficient to hold the valve open for the intended period of time. As specific examples, an injector waveform may be designated as a 5/3 or 6/4 waveform, thus denoting a pull-in current of 5 amps and a hold-in current of 3 amps, or alternatively a pull-in current of 6 amps and a hold-in current of 4 amps. It is noted that variations of the injector waveforms, including varying current levels, may be used without deviating from the scope of the present invention.

The fuel temperature compensation map 202 of FIG. 2 may include a plurality of maps to choose from, each map based on a determined operating condition of the fuel system 104, e.g., the injection event being one of a pilot and a main injection, the operating conditions of the engine 102, and the like.

FIG. 3 illustrates an alternate embodiment control strategy for fuel temperature compensation. The embodiment of FIG. 3 may be used in situations in which the single map technique of FIG. 2 is not deemed to be sufficient.

The inlet fuel temperature is sensed and delivered to a fuel temperature offset compensation map 304 and a fuel temperature slope compensation map 302. The output from the fuel temperature slope compensation map 302 is multiplied by the injection duration of the fuel injection event at a multiplying junction 306, and is then added to the output of the fuel temperature offset compensation map 304 at a summing junction 308. The result is a fuel temperature compensation factor. An exemplary fuel temperature offset compensation map 304 is shown in FIG. 5 and an exemplary fuel temperature slope compensation map 302 is shown in FIG. 6. Again, the values shown are illustrative only and are not meant to reflect actual values.

The second category, power loss compensation, may be determined by use of a control strategy such as shown in FIG. 7. The power loss compensation may be directed more to compensating for the heating effects of the fuel system 104 rather than the effects associated with the temperature of the fuel prior to the fuel system inlet 108.

A signal indicative of engine speed is delivered to a power trim offset map 702. The power trim offset map 702 may be a two dimensional map which provides an offset value for a given engine speed value. The offset value may then be added to the injection duration value at a summing junction 706. The resultant value may then be delivered to a positive value limiter 708 which allows positive values to pass through, but outputs a zero value for any negative values.

The engine speed value is also delivered to a steady state correction factor map 704. In addition, a value indicative of a quantity of fuel to be delivered is input to the steady state correction factor map 704. This value may be in terms of an actual quantity of fuel or may be expressed in terms such as rack position, which may be converted to fuel quantity. Although the term rack position originates from actual mechanical position of a rack for delivery of fuel, the term has remained in the art as a residual term used to denote fuel delivery quantity even without mechanical fuel delivery techniques.

The steady state correction factor map 704 may be a three dimensional map configured to provide a steady state correction factor output for a given engine speed and fuel delivery quantity input. The steady state correction factor may then be delivered to a low pass filter 710 for processing. The low pass filter 710 may be a first order filter of the form a/(s+a) and have a fairly long time constant, e.g., equivalent in length to the time it takes for the power loss of the engine 102 to reach a steady state condition. For example, the low pass filter 710 may have a time constant of about 17 minutes.

The output from the low pass filter 710 may then be multiplied by the output from the positive value limiter 708 at a multiplying junction 712 to obtain a power loss trim factor.

An exemplary power trim offset map 702 is depicted in FIG. 8, and an exemplary steady state correction factor map 704 is shown in FIG. 9. The values indicated in these maps are exemplary only and are not meant to reflect actual values.

As FIG. 10 illustrates, the power loss trim factor and the fuel temperature compensation factor may each be added to the initial injection pulse duration value 1002 via respective first and second summing junctions 1006,1008 to obtain a compensated injection pulse duration value 1004. Both the power loss trim factor and the fuel temperature compensation factor may be added or alternatively only one compensation factor may be used.

INDUSTRIAL APPLICABILITY

Operation of the present invention is described with reference to the flow diagrams of FIGS. 11–13.

Figure 11:
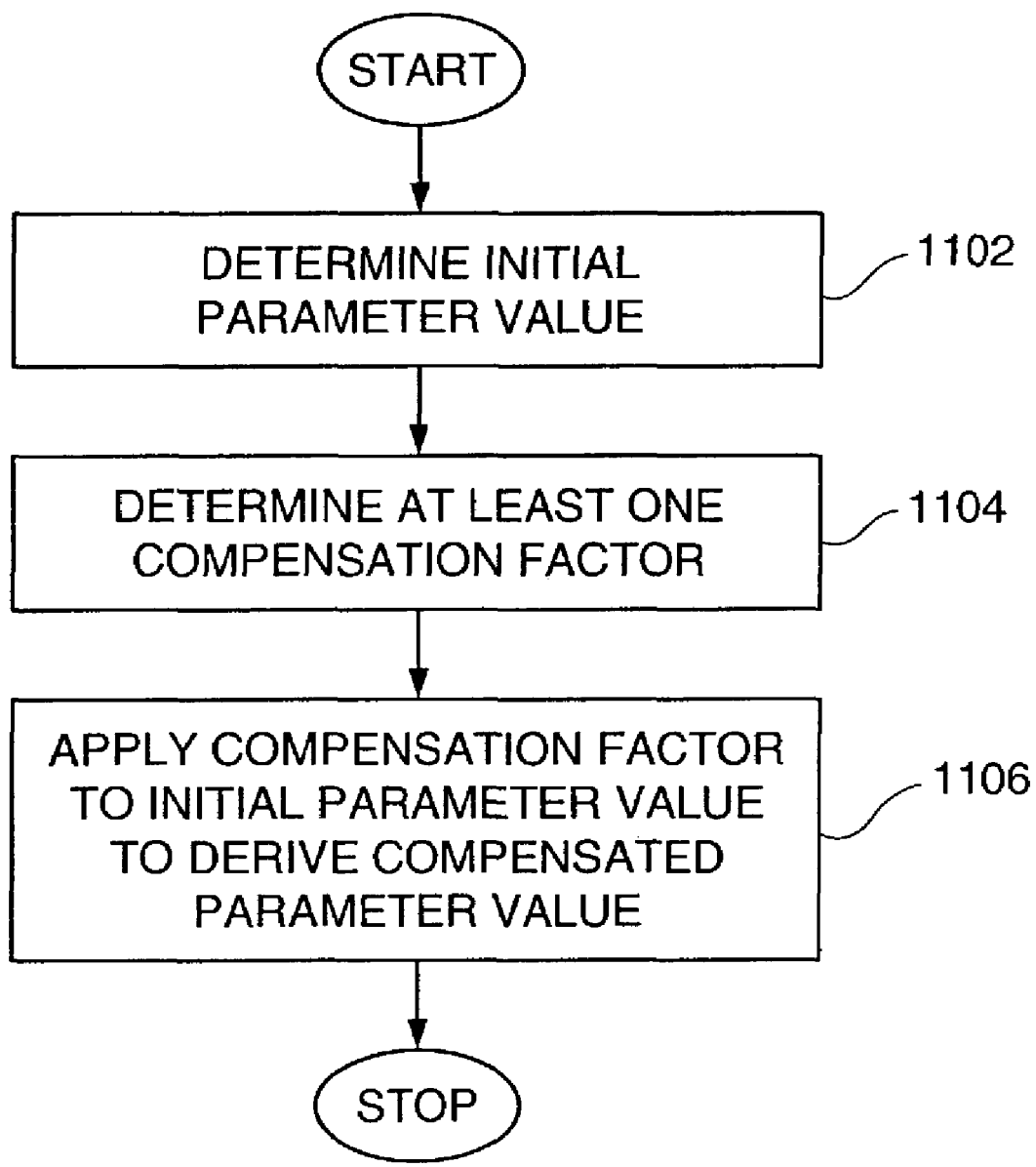
FIG. 11 is a flow diagram illustrating a preferred method of the present invention.

In a first control block 1102 in FIG. 11, an initial parameter value is determined. The initial parameter value may include an initial duration value of an injection of fuel.

In a second control block 1104, at least one compensation factor is determined. A compensation factor may include a fuel temperature compensation factor and a power loss trim factor, as described above.

In a third control block 1106, the at least one compensation factor is applied to the initial parameter value to derive a compensated parameter value. For example, as shown in FIG. 10, the initial duration value 1002 of a fuel injection pulse is made longer or shorter by adding at least one of the power loss trim factor and the fuel temperature compensation factor to derive the compensated duration value 1004.

Referring to FIG. 12, a method for compensating for fuel temperature during an injection of fuel is described.

In a first control block 1202, an initial fuel injection duration value of an injection event is determined. In a second control block 1204, the injection event is determined as being one of a pilot and a main injection if multiple injections are used. If a single injection event is used, the event is determined as being a main injection. It is noted that additional injection events may be defined, such as pre and post pilot injections and the like. These additional injection events may be applied to the present invention as well.

In a third control block, an operating condition associated with control of one of the pilot and main injections is determined. The operating condition may include the injection waveform used, such as for example a 5/3 or 6/4 waveform as described above.

A temperature of the fuel at a location prior to the fuel system inlet 108 is determined in a fourth control block 1208.

In a fifth control block 1210, a fuel temperature compensation map is selected as a function of the operating condition and the determination of the injection event being a pilot or main injection. In one embodiment, a fuel temperature compensation map 202 as embodied in FIGS. 2 and 4 is selected. In another embodiment, a fuel temperature slope compensation map 302 and a fuel temperature offset compensation map 304 are selected, as embodied in FIGS. 3, 5 and 6.

In a sixth control block 1212, a fuel temperature compensation factor is determined as a function of the fuel temperature compensation map(s). Control then proceeds to a seventh control block 1214, in which the fuel temperature compensation factor is applied to the initial fuel injection duration value to derive a compensated fuel injection duration value.

Referring to FIG. 13, a flow diagram illustrating a method for compensating for a power loss condition during an injection event is shown.

In a first control block 1302, an initial fuel injection duration value of an injection event is determined. In a second control block 1304, the injection event is determined as being one of a pilot and main injection. If there is only one injection event, the event is determined to be a main injection. If there are more than two injection events, each injection event may be considered separately in the following steps.

In a third control block 1306, a speed of the engine 102 is determined, either directly by use of a speed sensor 114 or by some indirect means typically well known in the art. A parameter associated with a quantity of fuel to be delivered is also determined, as noted in a fourth control block 1308.

In a fifth control block 1310, a power trim offset value is determined. The power trim offset value may be determined as a function of the engine speed and a power trim offset map 702.

In a sixth control block 1312, a steady state correction factor is determined as a function of the engine speed, the fuel quantity parameter, and a steady state correction factor map 704.

In a seventh control block 1314, a power loss trim factor is determined as a function of the power trim offset value, the steady state correction factor, and the determination of the injection event being one of a pilot and a main injection.

In an eighth control block 1316, the power loss trim factor is applied to the initial fuel injection duration value to derive a compensated fuel injection duration value.

Other aspects can be obtained from a study of the drawings, the disclosure, and the appended claims.

What is claimed is:

1. A method for determining a parameter associated with a delivery of fuel in an engine, comprising the steps of:
    determining an initial parameter value associated with the delivery of fuel;

determining at least one compensation factor based on a heating effect on a fuel temperature of fuel delivered to a combustion chamber via a fuel filter, and the at least one compensation factor being based at least in part on engine speed; and applying that at least one compensation factor to the initial parameter value to derive a compensated parameter value.

2. A method, as set forth in claim 1, wherein the delivery of fuel includes an injection of fuel into a combustion chamber.

3. A method, as set forth in claim 2, wherein determining an initial parameter value includes the step of determining an initial duration value of an injection of fuel.

4. A method, as set forth in claim 3, wherein determining at least one compensation factor includes the step of determining at least one factor for changing the initial duration value based at least in part on a fuel temperature prior to an inlet into a fuel system.

5. A method, as set forth in claim 4, wherein applying the at least one compensation factor to the initial parameter value includes the step of changing the initial duration value by the at least one compensation factor to derive a compensated duration value.

6. A method, as set forth in claim 2, wherein an injection of fuel includes a single injection of fuel.

7. A method, as set forth in claim 2, wherein an injection of fuel includes multiple injections of fuel.

8. A method, as set forth in claim 1, wherein determining at least one compensation factor includes the step of determining a fuel temperature compensation factor associated with fuel temperature prior to an inlet to a fuel system and determining a separate power loss trim factor associated with fuel heating after the inlet to the fuel system.

9. A method for determining a parameter associated with a delivery of fuel in an engine, comprising the steps of:
   determining an initial parameter value associated with the delivery of fuel;
   determining at least one compensation factor based on a heating effect of a fuel and a fuel system;
   applying that at least one compensation factor to the initial parameter value to derive a compensated parameter value;
   wherein determining at least one compensation factor includes the step of determining a fuel temperature compensation factor;
   wherein determining a fuel temperature compensation factor includes the steps of:
      determining an operating condition of the fuel system;
      determining a temperature of fuel at a location prior to inlet into the fuel system;
      selecting a fuel temperature compensation map as a function of the operating condition; and
      determining the fuel temperature compensation factor as a function of the temperature of the fuel and the fuel temperature compensation map.

10. A method for determining a parameter associated with a delivery of fuel in an engine, comprising the steps of:
    determining an initial parameter value associated with the delivery of fuel;
    determining at least one compensation factor based on a heating effect of a fuel and a fuel system;
    applying that at least one compensation factor to the initial parameter value to derive a compensated parameter value;
    wherein determining at least one compensation factor includes the step of determining a fuel temperature compensation factor;
    wherein determining a fuel temperature compensation factor includes the step of:
       determining an operating condition of the fuel system;
       determining a temperature of fuel at a location prior to inlet into the fuel system;
       selecting a fuel temperature offset compensation map as a function of the operating condition;
       selecting a fuel temperature slope compensation map as a function of the operating condition; and
       determining the fuel temperature compensation factor as a function of the temperature of the fuel and the fuel temperature offset and slop compensation maps.

11. A method, as set forth in claim 1, wherein determining at least one compensation factor includes the step of determining a power loss trim factor associated with fuel heating after entry into an inlet of a fuel system.

12. A method for determining a parameter associated with a delivery of fuel in an engine, comprising the steps of:
    determining an initial parameter value associated with the delivery of fuel;
    determining at least one compensation factor based on a heating effect of a fuel and a fuel system;
    applying that at least one compensation factor to the initial parameter value to derive a compensated parameter value;
    wherein determining at least one compensation factor includes the step of determining a power loss trim factor;
    wherein determining a power loss trim factor includes the steps of:
       determining a speed of the engine;
       determining a parameter associated with a quantity of fuel to be delivered;
       determining a power trim offset value as a function of the engine speed and a power trim offset map;
       determining a steady state correction factor as a function of the engine speed, the fuel quantity parameter, and a steady state correction factor map; and
       determining the power loss trim factor as a function of the power trim offset value and the steady state correction factor.

13. A method, as set forth in claim 1, wherein determining at least one compensation factor includes the step of determining a fuel temperature compensation factor and a power loss trim factor; and
    summing the power loss trim factor and the fuel temperature compensation factor.

14. A method for determining a fuel injection event parameter for an internal combustion engine, comprising the steps of:
    determining an initial fuel injection event parameter;
    determining a fuel temperature compensation factor based upon a fuel temperature prior to a fuel system inlet and a power loss trim factor based on a heating effect in the fuel system of fuel delivered to a combustion chamber via a fuel filter; and
    determining a compensated fuel injection event parameter as a function of the initial fuel injection event parameter and both of the fuel temperature compensation factor and the power loss trim factor.

15. A method, as set forth in claim 14, wherein the fuel injections event parameter is indicative of a duration value of an injection of fuel.

16. A method for determining a fuel injection event parameter for an internal combustion engine, comprising the steps of:
  determining an initial fuel injection event parameter;
  determining at least one of a fuel temperature compensation factor and a power loss trim factor based on a heating effect of a fuel and a fuel system; and
  determining a compensated fuel injection event parameter as a function of the initial fuel injection event parameter and the at least one fuel temperature compensation factor and power loss trim factor;
  wherein the fuel injections event parameter is indicative of a duration value of an injection of fuel;
  wherein determining a fuel temperature compensation factor includes the steps of:
    determining an operating condition associated with a fuel injection event;
    determining a temperature of fuel at a location prior to inlet into a fuel system;
    selecting a fuel temperature compensation map as a function of the operating condition; and
    determining the fuel temperature compensation factor as a function of the temperature of the fuel temperature compensation map.

17. A method for determining a fuel injection event parameter for an internal combustion engine, comprising the steps of:
  determining an initial fuel injection event parameter;
  determining at least one of a fuel temperature compensation factor and a power loss trim factor based on a heating effect of a fuel and a fuel system; and
  determining a compensated fuel injection event parameter as a function of the initial fuel injection event parameter and the at least one fuel temperature compensation factor and power loss trim factor;
  wherein the fuel injections event parameter is indicative of a duration value of an injection of fuel;
  wherein determining a fuel temperature compensation factor includes the steps of:
    determining an operating condition associated with a fuel injection event;
    determining a temperature of fuel at a location prior to inlet into a fuel system;
    selecting each of the fuel temperature offset compensation map and a fuel temperature slope compensation map as a function of the operating condition; and
    determining the fuel temperature compensation factor as a function of the temperature of the fuel, the fuel temperature offset compensation map, and the fuel temperature slope compensation map.

18. A method for determining a fuel injection event parameter for an internal combustion engine, comprising the steps of:
  determining an initial fuel injection event parameter;
  determining at least one of a fuel temperature compensation factor and a power loss trim factor based on a heating effect of a fuel and a fuel system; and
  determining a compensated fuel injection event parameter as a function of the initial fuel injection event parameter and the at least one fuel temperature compensation factor and power loss trim factor;
  wherein the fuel injections event parameter is indicative of a duration value of an injection of fuel;
  wherein determining a power loss trim factor includes the steps of:
    determining a speed of the engine;
    determining a parameter associated with a quantity of fuel to be delivered;
    determining a power trim offset value as a function of the engine speed and a power trim offset map;
    determining a steady state correction factor as a function of the engine speed, the fuel quantity parameter, and a steady state correction factor map; and
    determining the power loss trim factor as a function of the power trim offset value and the steady state correction factor.

19. A method for compensating for fuel temperature during an injection of fuel into a fuel system in an engine, comprising the steps of:
  determining an initial fuel injection duration value of an injection event;
  determining the injection event as being one of a pilot and a main injection;
  determining an operating condition associated with control of one of the pilot and main injections;
  determining a temperature of fuel at a location prior to inlet into the fuel system;
  selecting a fuel temperature compensation map as a function of the operating condition and the determination of the event being one of a pilot and a main injection;
  determining a fuel temperature compensation factor as a function of the fuel temperature compensation map; and
  applying the fuel temperature compensation factor to the initial fuel injection duration value to derive a compensated fuel injection duration value.

20. A method, as set forth in claim 19, wherein selecting a fuel temperature compensation map includes the step of selecting each of a fuel temperature offset compensation map and a fuel temperature slope compensation map, and wherein determining a fuel temperature compensation factor includes the step of determining a fuel temperature compensation factor as a function of the fuel temperature offset and slope compensation maps.

21. A method for compensating for a power loss condition during an injection of fuel into a fuel system in an engine comprising the steps of:
  determining an initial fuel injection duration value of an injection event;
  determining the injection event as being one of a pilot and a main injection;
  determining a speed of the engine;
  determining a parameter associated with a quantity of fuel to be delivered;
  determining a power trim offset value as a function of the engine speed and a power trim offset map;
  determining a steady state correction factor as a function of the engine speed, the fuel quantity parameter, and a steady state correction factor map;
  determining a power loss trim factor as a function of the power trim offset value, the steady state correction factor, and the determination of the injection event as being one of a pilot and a main injection; and
  applying the power loss trim factor to the initial fuel injection duration value to derive a compensated fuel injection duration value.

22. An apparatus for determining a duration value for a fuel injection event of a fuel system in an internal combustion engine, comprising:
  a fuel supply;
  a fuel system inlet for receiving fuel from the fuel supply;

a temperature sensor located such that a temperature of the fuel prior to the inlet is sensed;
an engine speed determining device; and
a controller for receiving signals from the temperature sensor and the engine speed determining device, determining at least one of a fuel temperature compensation factor and a power loss trim factor based on a heating effect of a fuel and a fuel system, and responsively determining a compensated duration value for the fuel injection event.

23. An apparatus, as set forth in claim 22, wherein the controller includes at least one of:

a fuel temperature compensation map;
a fuel temperature offset compensation map;
a fuel temperature slope compensation map;
a power trim offset map; and
a steady state correction factor map.

24. An apparatus, as set forth in claim 23, wherein the controller further includes a steady state correction factor low pass filter.

* * * * *